(12) United States Patent
Baba et al.

(10) Patent No.: US 7,653,388 B2
(45) Date of Patent: Jan. 26, 2010

(54) MOBILE RADIO COMMUNICATIONS METHOD AND MOBILE SUBSCRIBER TERMINAL

(75) Inventors: Takayuki Baba, Tokyo (JP); Takashi Abe, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 573 days.

(21) Appl. No.: 10/395,388

(22) Filed: Mar. 25, 2003

(65) Prior Publication Data
US 2004/0203761 A1 Oct. 14, 2004

(30) Foreign Application Priority Data
Mar. 28, 2002 (JP) .............................. 2002-091462

(51) Int. Cl.
H04W 4/00 (2009.01)
H04W 40/00 (2009.01)
H04W 24/00 (2009.01)
H04M 11/04 (2006.01)

(52) U.S. Cl. ................. 455/433; 455/404.2; 455/432.1; 455/455; 455/456.1

(58) Field of Classification Search ................. 455/445, 455/456, 466, 432.3, 433, 566, 404.2, 456.1, 455/432.1; 379/207.02, 213.01
See application file for complete search history.

(56) References Cited

U.S. PATENT DOCUMENTS

| | | | | |
|---|---|---|---|---|
| 5,978,678 | A * | 11/1999 | Houde et al. ................. 455/433 |
| 6,064,887 | A * | 5/2000 | Kallioniemi et al. ......... 455/445 |
| 6,556,823 | B2 * | 4/2003 | Clapton et al. ............ 455/432.3 |
| 6,570,973 | B1 * | 5/2003 | Boughman et al. ...... 379/207.02 |
| 6,665,535 | B1 | 12/2003 | Miura et al. |
| 6,718,025 | B2 * | 4/2004 | Boughman et al. ...... 379/207.02 |
| 6,751,483 | B1 * | 6/2004 | Oh .............................. 455/566 |
| 2002/0025821 | A1 * | 2/2002 | Clapton et al. .............. 455/456 |
| 2002/0123359 | A1 * | 9/2002 | Wei et al. ..................... 455/466 |
| 2003/0185373 | A1 * | 10/2003 | Boughman et al. ...... 379/207.02 |
| 2004/0053618 | A1 * | 3/2004 | Leppanen et al. ........... 455/445 |

OTHER PUBLICATIONS

Japanese Patent Office Action issued Dec. 7, 2004 for Priority Application No. 2002-091462.
Patent Abstracts of Japan, Publication No. 05-191343, Published Jul. 30, 1993.
Patent Abstracts of Japan, Publication No. 06-245253, Published Sep. 2, 1994.
Patent Abstracts of Japan, Publication No. 11-146096, Published May 28, 1999.
Patent Abstracts of Japan, Publication No. 2001-025061, Published Jan. 26, 2001.
Patent Abstracts of Japan, Publication No. 2001-358835, Published Dec. 26, 2001.

* cited by examiner

*Primary Examiner*—Thjuan K Addy
(74) *Attorney, Agent, or Firm*—Fujitsu Patent Center

(57) ABSTRACT

A mobile radio communications method that prevents a calling user from being billed for an expensive overseas call, which the user could make without knowing that the destination mobile terminal is currently roaming abroad. When a mobile terminal has moved from a first country to a second country, its home mobile switch is informed of the new terminal location. The home mobile switch consults this location information when a call request to the roaming mobile terminal is placed by another mobile terminal, so as to determine in which country the destination is. If it turns out to be in the second country, the home mobile switch so notifies the calling mobile terminal by sending an overseas destination notice to it. This notice warns the calling user that he/she is making eventually an international call, thus allowing him/her to reconsider whether to proceed with the call request or cancel it.

9 Claims, 12 Drawing Sheets

OVERSEAS-VISITING TERMINAL TABLE

| ITEM | DATA |
|---|---|
| 101 — OVERSEAS-VISITING PHONE NUMBER | 090-1234-1234 |
| 102 — COUNTRY CODE | 81 (JAPAN) |

FIG. 3

SERVICE SUBSCRIPTION DATABASE

| ITEM | DATA |
|---|---|
| CALLER PHONE NUMBER | 090-5678-5678 |
| SUBSCRIPTION FLAG | 1 (SUBSCRIBER) |

111 → CALLER PHONE NUMBER
112 → SUBSCRIPTION FLAG

FIG. 4

CALL RATE DATABASE

| ITEM | DATA |
|---|---|
| 121 — COUNTRY CODE | 81 |
| 122 — COUNTRY NAME | JAPAN |
| 123 — APPROXIMATE RATE | $2.30/min |
| 124 — TIME ZONE DIFFERENCE | +19 |

FIG. 5

OVERSEAS DESTINATION NOTICE

> Calling at Feb 28  3:03 PM
>
> Jane Doe
>
> 090-1234-1234
>
> Japan     $2.30/min
>
> March 1, 2002  10:03 AM (Local)

FIG. 8

CALL DETAIL REPORT

You called at Feb 28  3:04 PM

Jane Doe 090-1234-1234

Japan   March 1, 2002

10:04 AM to 10:26 AM (Local)

$50.60             22 min

FIG. 9

**CALL LOG DATABASE
(RECORD OF CANCELED CALL ATTEMPT)**

| ITEM | DATA |
| --- | --- |
| 201 — ORIGINATING CALL NUMBER | 090-5678-5678 |
| 202 — CALL DATE AND TIME | March 1, 2002  10:04 AM |
| 203 — ORIGINATING COUNTRY CODE | 01  (United States) |
| 204 — TIME ZONE DIFFERENCE | -19 |

FIG. 10

CALL LOG RECORD

Call attempted at March 1  10:04 AM

By John Doe 090-5678-5678

United States   Feb 28, 3:04 PM

MOBILE RADIO COMMUNICATIONS METHOD AND MOBILE SUBSCRIBER TERMINAL

BACKGROUND OF THE INVENTION

1. Field of the Invention

The present invention relates to a mobile radio communications method and a mobile subscriber terminal for use in a system where a home mobile switch and visitor mobile switch are interconnected by a telecommunications network to allow a mobile terminal to communicate with other terminals, no matter where it roams in their service areas. More particularly, the present invention relates to a mobile radio communications method which supports global roaming services to enable one subscriber to call another subscriber who is visiting abroad, and also to a mobile terminal designed for such services.

2. Description of the Related Art

The advancement of radio telecommunications technologies has enabled us to enjoy mobile phone services in wide areas. With the international standards for mobile communications, we can use the same terminal equipment in both domestic and overseas areas through the facilities known as global roaming services. The code-division multiple access (CDMA) systems, for example, are deployed in the United States, Canada, Korea, China (Hong Kong), and other areas, allowing the users to roam from one country to another.

Suppose here that one mobile user in his/her home country is attempting to reach another mobile user who subscribes to global roaming services. When the called user happens to be roaming abroad, the calling user will eventually place an international call to the overseas destination. International phone calls, however, are much more expensive than domestic calls. The problem is that the calling mobile user is unable to know that he/she is calling (or has called) abroad, until the called person answers the call and the calling user receives a bill for it, because conventional mobile communications systems simply connect him/her to the specified destination terminal, regardless of whether it is in a domestic location or overseas location. After all, the calling user has to pay for an expensive international call that he/she made unintentionally.

In the case of domestic mobile phone services, most carriers provide a service of notifying a calling user of the duration and approximate cost of a phone call that he/she has just finished. Such existing notification services, however, do not address the problem described above because unintentional overseas connections cannot be avoided by merely sending a service usage report afterwards.

SUMMARY OF THE INVENTION

In view of the foregoing, it is an object of the present invention to provide a mobile communication control method that prevents a calling user from being billed for an expensive overseas call, which the user could make without knowing that the destination mobile terminal is currently roaming abroad.

It is another object of the present invention to provide a mobile terminal that prevents a calling user from being billed for an expensive overseas call, which the user could make without knowing that the destination mobile terminal is currently roaming abroad.

To accomplish the first object stated above, according to one aspect of the present invention, there is provided a method of controlling a mobile communication process in a system where a home mobile switch in a first country and a visitor mobile switch in a second country are interconnected by a telecommunications network to allow a first mobile terminal in the first country to reach a second mobile terminal that is using global roaming service after having moved from the first country to the second country. This method comprises the following steps: (a) sending terminal location information of the second mobile terminal from the visitor mobile switch to the home mobile switch; (b) consulting the terminal location information in the home mobile switch when a call request addressed to the second mobile terminal is received from the first mobile terminal; and (c) sending an overseas destination notice from the home mobile switch to the first mobile terminal to indicate that the second mobile terminal is located in the second country.

Also, to accomplish the second object stated above, according to another aspect of the present invention, there is provided a mobile terminal for use in a system where a home mobile switch in a first country and a visitor mobile switch in a second country are interconnected by a telecommunications network to allow the mobile terminal in the first country to reach another mobile terminal that is using global roaming service after having moved from the first country to the second country. This mobile terminal comprises the following elements: a call request unit that initiates a call request addressed to the other mobile terminal; a notice receiver that receives an overseas destination notice after the call request unit has initiated the call request, the overseas destination notice indicating that the destination mobile terminal is currently located in the second country; a display unit that shows the received overseas destination notice; and a command unit that commands the home mobile switch either to proceed with the call request or to cancel the call request, according to a user's instruction given after the display unit has shown the received overseas destination notice.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 shows an example of an overseas-visiting terminal table.

FIG. 4 shows an example of a record stored in a service subscription database.

FIG. 5 shows an example of a record stored in a call rate database.

FIG. 8 shows an example screenshot of an overseas destination notice which appears on a calling mobile terminal when it is in the first country.

FIG. 9 shows an example screenshot of a call detail report which appears on a mobile terminal when it has finished a call from the first country.

FIG. 10 shows an example of a call log database stored in a visitor mobile switch.

FIG. 11 shows an example screenshot of a call log record which appears on a mobile terminal when it is roaming abroad.

DESCRIPTION OF THE PREFERRED EMBODIMENTS

Figure 1:
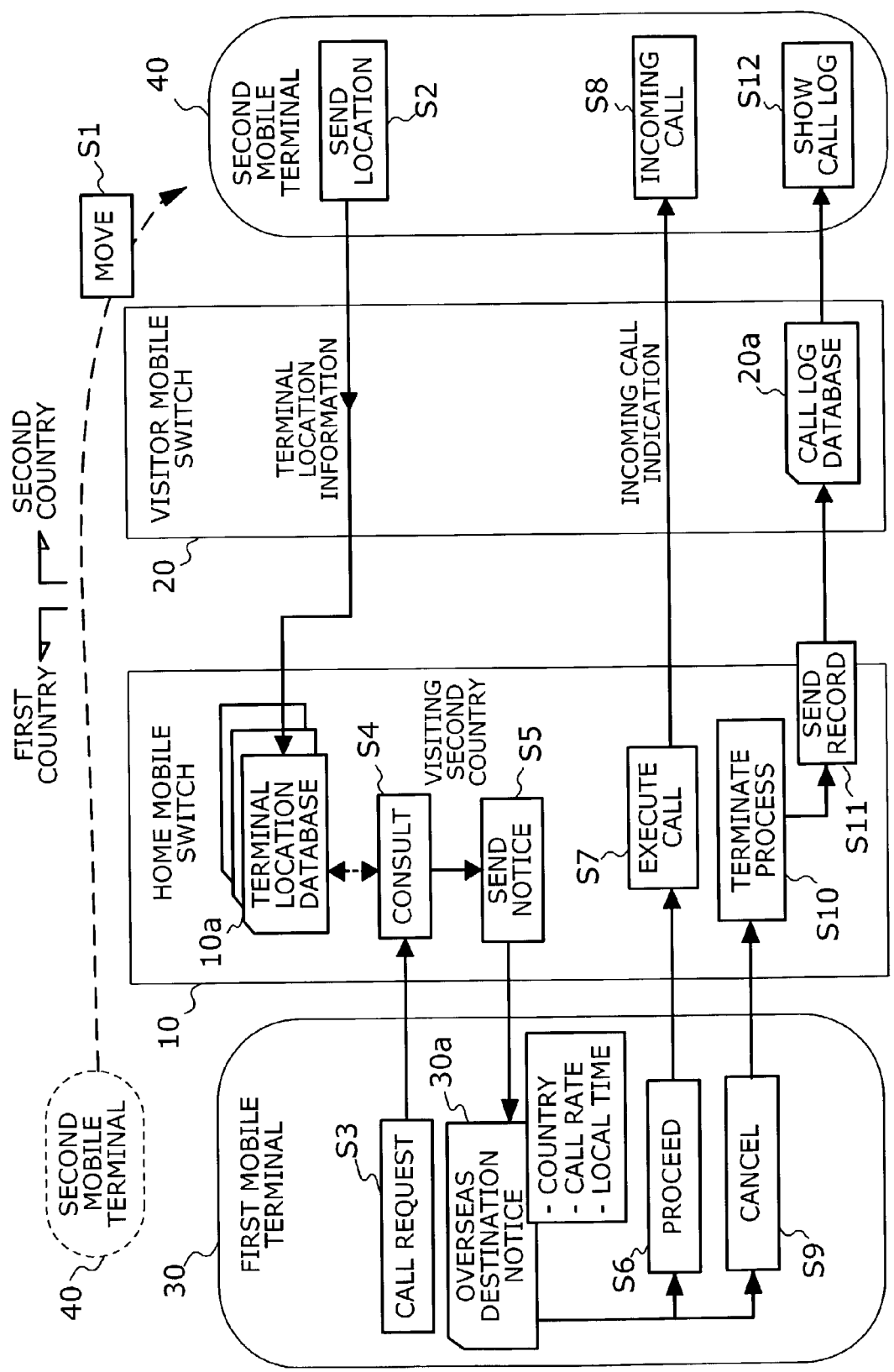
FIG. 1 is a conceptual view of a mobile phone system according to the present invention.

Preferred embodiments of the present invention will be described below with reference to the accompanying drawings, wherein like reference numerals refer to like elements throughout.

FIG. 1 is a conceptual view of a mobile phone system and its call process steps according to the present invention. The illustrated system includes two mobile telephone switching systems 10 and 20, covering their respective service areas in a first country and second country. They are interconnected by a trunk network (not shown in FIG. 1). Further, a plurality of radio base stations (not shown) are deployed to provide wireless links between mobile terminals and switching systems in their respective service areas.

On the left half of FIG. 1, the telephone switching system 10 serves a first mobile terminal 30 and a second mobile terminal 40, when they are located in their home area, i.e., the first country. The telephone switching system 10 in the first country is therefore referred to herein as their "home mobile switch." The right half of FIG. 1, on the other hand, illustrates that the other telephone switching system 20 serves as a mobile switch for the second mobile terminal 40 when it is roaming in the second country. The telephone switching system 20 is therefore referred to herein as the "visitor mobile switch." As can be seen from the above explanation, the users of the two mobile terminals 30 and 40 both subscribe to mobile phone services provided by the home mobile switch 10. The user of the second mobile terminal 40 is also a subscriber of global roaming services provided by the visitor mobile switch 20.

The mobile terminals 30 and 40 can communicate with each other through the home mobile switch 10 when both of them are located in its service area, in which case the domestic call rate is applied to calculate call charges. When the second mobile terminal 40 is moved to the second country, the visitor mobile switch 20 relays a call from the first mobile terminal 30, so that the roaming mobile terminal 40 can be accessed with the same phone number as that used in the first country. In this case, the call charges are calculated on the basis of a different fee schedule, which is set, in general, in a higher cost range, compared to the domestic rate.

According to the present invention, the home mobile switch 10 provides the calling terminal with an overseas destination notice 30a to warn the calling party that the called terminal is currently roaming abroad. To this end, the home mobile switch 10 is designed to determine the present location of each called terminal, suspend the call processing for such a call request with an overseas destination, send an overseas destination notice to the calling party, and resume the call processing only when the calling party permits it to proceed.

FIG. 1 exemplifies a process of the above-outlined mobile communication service, which proceeds as follows. At step S1, the second mobile terminal 40 moves from the first country to the second country. As it enters the service area of the visitor mobile switch 20, the second mobile terminal 40 registers itself with the visitor mobile switch 20 at step S2 by sending terminal location information showing that the user of the second mobile terminal 40 is now staying in the second country. There may actually be a couple of methods for the second mobile terminal 40 to make a location registration. One is, for example, that the user of the second mobile terminal 40 initiates it manually by operating the keypad in a predetermined sequence. Another is an automatic method in which the second mobile terminal 40 makes a notification in response to beacon signals that the visitor mobile switch 20 periodically transmits over its service area through its subordinate radio base stations (not shown).

The terminal location information of the second mobile terminal 40 is forwarded from the visitor mobile switch 20 to the home mobile switch 10. The home mobile switch 10 stores the received information as a record of its terminal location database 10a in its local storage. This terminal location database 10a may be a part of its home location register, i.e., the database that records the location of every mobile subscriber terminal that the home mobile switch 10 serves. The visitor mobile switch 20 may be configured to update its own visitor location register when the terminal location information of the second mobile terminal 40 is received.

Suppose at step S3 that the first mobile terminal 30 initiates a call request to the second mobile terminal 40. At step S4, the call request is accepted by the home mobile switch 10. It is, however, suspended for the time being. Instead, the home mobile switch 10 first consults the terminal location database 10a to find an entry that is relevant to the called terminal 40. The home mobile switch 10 has now learned that the called terminal 40 is not in its own service area, but in the second country. Then, at step S5, it sends back an overseas destination notice 30a to the calling terminal 30. This overseas destination notice 30a contains, for example, the following pieces of information: the name of the second country, call rate (i.e., phone charge per unit time) for the second country, and the present local time in the second country.

The first mobile terminal 30 outputs the received overseas destination notice 30a on its screen. The user of the first mobile terminal 30 thus becomes aware of the fact that the person he/she is calling is currently in a foreign country. To proceed with the pending call request, he/she has to request the home mobile switch 10 to do so at step S6. At step S7, the home mobile switch 10 initiates a call to the second mobile terminal 40 through the visitor mobile switch 20. This call finally reaches the second mobile terminal 40 at step S8, and its user accepts the incoming call, thus starting a communication session between the two terminals 30 and 40. Optionally, the home mobile switch 10 sends an e-mail message to the first mobile terminal 30 to indicate the amount of the charge when the call is finished.

Referring back to step S6, the user of the first mobile terminal 30 is allowed to make another choice, i.e., aborting the call, in view of the overseas destination notice 30a received at step S5. If this is the case, the home mobile switch 10 will receive an "abort call" request at step S9. The home mobile switch 10 then terminates the ongoing process for the call request at step S10. It also informs, at step S11, the visitor mobile switch 20 that there was a call attempt from the first mobile terminal 30 to the second mobile terminal 40. The visitor mobile switch 20 then updates its call log database 20a with the received information. At step S12, this new call log record is sent out to the second mobile terminal 40. The visitor mobile switch 20 executes the step S12 at the same time as it updates the call log database 20a, or alternatively at predetermined intervals. The user of the second mobile terminal 40 finds the delivered call log record and thus learns that a call attempt from the first mobile terminal 30 has been canceled. This information allows him/her to call back immediately or later when he/she comes back to the first country.

The above-described service of delivering overseas destination notices 30a may actually be implemented on a subscription basis. That is, in the example of FIG. 1, the user of the first mobile terminal 30 has to subscribe to the overseas destination notification service, and the home mobile switch 10 has to maintain a service subscription database to manage the information about which user is eligible for the service. With this implementation, the home mobile switch 10 will behave in the following way. It consults the terminal location database 10a at step S4 in response to a call request from the first mobile terminal 30, and if the called terminal 40 turns out to be in the second country at present, it then looks up the service subscription database to determine whether the user of the calling terminal 30 is registered with the overseas destination notification service. The home mobile switch 10 can go to step S5 only when the calling user is eligible for the service. Otherwise, it proceeds to step S7 to execute the requested call immediately. In this way, overseas destination notices can be delivered only to the registered service subscribers.

To summarize the above process of mobile radio communication, the home mobile switch 10 in the first country manages a terminal location database 10a that indicates in which country each mobile terminal is currently located. When a first mobile terminal 30 has issued a call request addressed to a second mobile terminal 40, and if the terminal location database 10a shows that the called terminal 40 is in the second country, the home mobile switch 10 sends an overseas destination notice 30a to the calling terminal 30 prior to establishing a circuit connection with the visitor mobile switch 20. This notice allows the calling user to determine whether to proceed with the call, thus giving him/her a chance to cancel it when does not wish to pay for an expensive international call. That is, the present invention prevents a mobile phone user from being billed an unexpected international call charge, without knowing the actual location of a called party.

Figure 2:
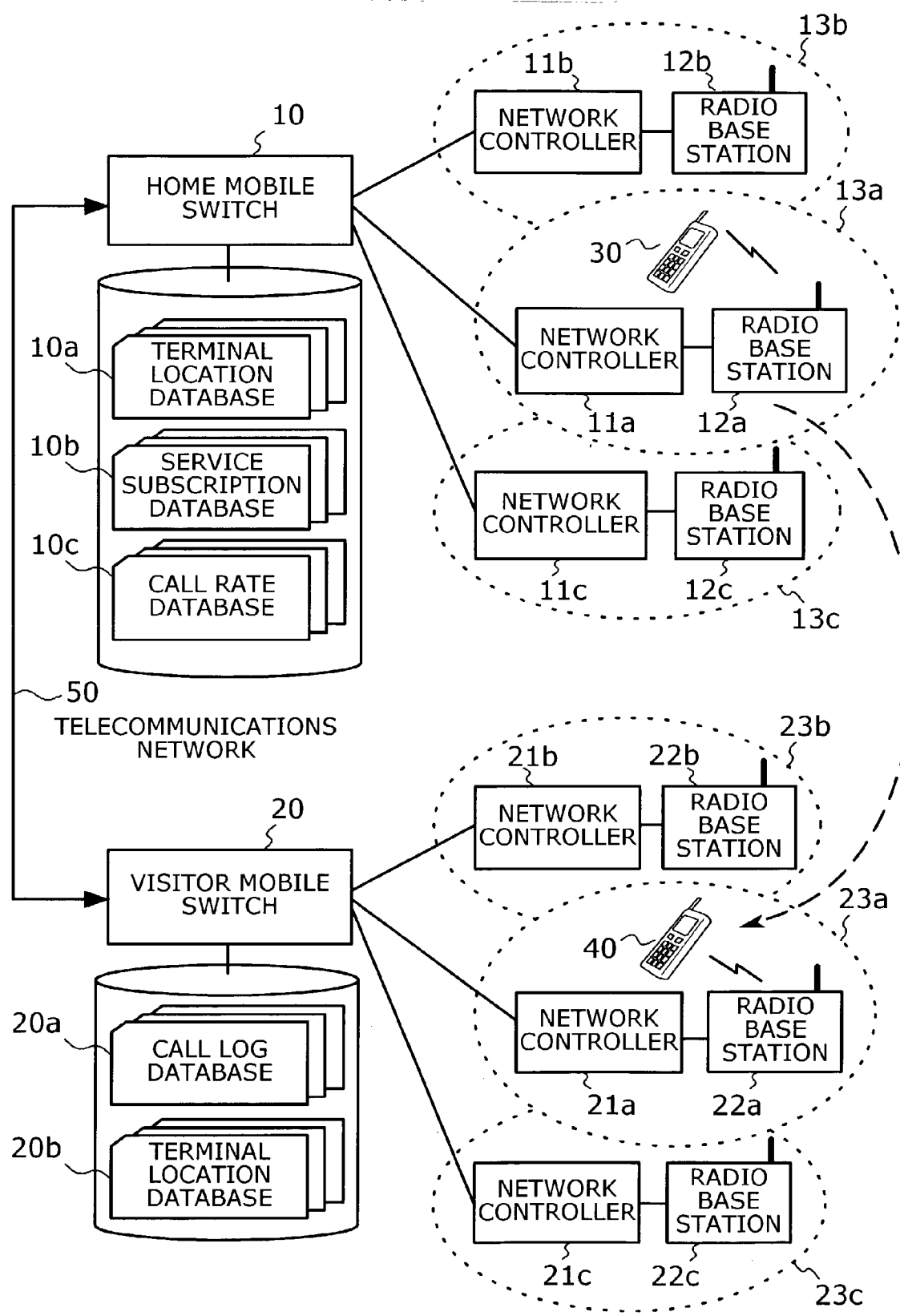
FIG. 2 is a block diagram showing a specific example of a mobile phone system where the present invention is embodied.

Referring next to FIG. 2, a block diagram is shown for an example of a mobile phone system according to the present invention. The illustrated system employs a home mobile switch 10 in a first country, which is connected to a plurality of radio base stations 12a, 12b, and 12c through network controllers 11a, 11b, and 11c, respectively. The network controllers 11a to 11c control communication between the home mobile switch 10 and each radio base station 12a to 12c. The radio base stations 12a to 12c use CDMA or other appropriate radio access system in order to serve mobile terminals 30 and 40 located in their respective radio coverage areas, or cells 13a, 13b, and 13c.

The home mobile switch 10 has the following three databases: terminal location database 10a, service subscription database 10b, and call rate database 10c. The terminal location database 10a stores location information of mobile terminals 30 and 40 in the cells 13a to 13c. The service subscription database 10b stores records indicating whether each mobile user subscribes to the overseas destination notification service. This service subscription enables users to know the destination country of a call that they are making, before being actually connected to the destination. The call rate database 10c stores a rate schedule (i.e., a list of call charge per unit time) for domestic calls within the first country, as well as for overseas calls from the first country to the second country.

The above-described home mobile switch 10 is linked also to a visitor mobile switch 20 in the second country through a telecommunications network 50. The visitor mobile switch 20 is connected to a plurality of radio base stations 22a, 22b, and 22c through network controllers 21a, 21b, and 21c, respectively. The network controllers 21a to 21c control communication between the visitor mobile switch 20 and each radio base station 22a to 22c. The radio base stations 22a to 22c serve mobile terminals (e.g., second mobile terminal 40) located in their respective radio coverage areas, or cells 23a, 23b, and 23c. Those second-country cells 23a, 23b, and 23c use the same radio access system (e.g., CDMA) as in the first country.

The visitor mobile switch 20 has a call log database 20a and a terminal location database 20b. The call log database 20a stores records of such incoming call requests that were initiated (but not executed) from the first country to the second country. The terminal location database 20b stores terminal location information of mobile terminals, including the second mobile terminal 40, in the cells 23a to 23c.

In the following section, we will first describe how the illustrated system processes domestic calls, assuming that both first and second mobile terminals 30 and 40 reside in the first country. The home mobile switch 10 offers mobile phone services in its service area, including all the first-country cells 13a to 13c. The mobile terminals 30 and 40 can therefore roam from cell to cell in this area, while the home mobile switch 10 keeps track of their present locations and updates the terminal location database 10a in its home location register when a new location is received through either of the radio base stations 12a to 12c.

Suppose, for example, that there is a domestic call from the first mobile terminal 30 to the second mobile terminal 40 in the first country. This call request reaches the home mobile switch 10 through a radio base station with which the first mobile terminal 30 is currently registered. The home mobile switch 10 then searches the terminal location database 10a to find a record that is relevant to the called terminal 40, thereby figuring out in which cell it is located. The home mobile switch 10 sends an incoming call indication to the second mobile terminal 40 via the radio base station of the identified cell. When the second mobile terminal 40 responds to this indication, the home mobile switch 10 sets up a connection link between the calling terminal 30 and called terminal 40, thus allowing the two users to talk to each other.

When the second mobile terminal 40 moves to the second country, the illustrated system permits the user to enjoy the overseas roaming service (if he/she is a subscriber to that service). The following will explain the basic mechanism for this service. Just as the home mobile switch 10 does in the first country, the visitor mobile switch 20 offers mobile phone services in its service area including all the second-country cells 23a to 23c. To make the second mobile terminal 40 operable in the second country, the user has to register his/her terminal 40 with the visitor mobile switch 20 after having entered into its service area. This initial registration is accomplished by pressing some keys on the second mobile terminal 40 in a predetermined sequence to make access to the visitor mobile switch 20. Upon receipt of this access attempt through one of the radio base stations 22a to 22c, the visitor mobile switch 20 communicates with the home mobile switch 10 to collect data about the requesting mobile terminal 40, including its service status and parameters. At the same time, the visitor mobile switch 20 provides the home mobile switch 10 with the terminal location information indicating that the second mobile terminal 40 is currently located in the second country. We will describe the terminal location information in more detail later.

When the information about the second mobile terminal 40 is obtained, the visitor mobile switch 20 updates its terminal location database 20b with that information. It also responds to the registration request from the second mobile terminal 40 by sending a message including the code of the second country. This country code permits the second mobile terminal 40 to reconfigure its language setups, for instance, so that it will be able to operate in global roaming mode for convenience in the second country.

The system may be configured to initiate the above-described initial registration process automatically when the second mobile terminal 40 enters the service area of the visitor mobile switch 20. If this is the case, the second mobile terminal 40 makes a registration upon detection of beacon signals that the visitor mobile switch 20 periodically broadcasts through all the radio base stations 22a to 22c in its service area.

Now that the second mobile terminal 40 is registered with the visitor mobile switch 20, every phone call addressed to the terminal 40 is routed to the visitor mobile switch 20, whether it is from within the second country or abroad. The visitor mobile switch 20 then searches its own terminal location database 20b to find a relevant record, thereby figuring out in which of the cells 23a to 23c the called terminal 40 is located. It sends an incoming call indication to the second mobile terminal 40 via the radio base station of the identified cell, and the called terminal 40 responds to that indication to start a communication session.

As we have mentioned earlier, the visitor mobile switch 20 provides the home mobile switch 10 with terminal location information during an initial registration process for the visiting mobile terminal 40. With that information, the home mobile switch 10 knows that the mobile terminal 40 is now in the second country and thus creates an overseas-visiting terminal table in its terminal location database 10a. FIG. 3 shows an example of this overseas-visiting terminal table, which contains an overseas-visiting phone number 101 and a country code 102. The overseas-visiting phone number 101 shows the phone number of a mobile terminal whose owner subscribes to the global roaming service and is currently using it. The country code 102 indicates in which country the mobile terminal of interest is located. The code "81" shown in the example of FIG. 3 means that the mobile terminal is in Japan at present.

Using the above overseas-visiting terminal table 101, the home mobile switch 10 routes a call from a terminal within its service area (e.g., first mobile terminal 30) to another terminal that is roaming in a different country (e.g., second mobile terminal 40). The home mobile switch 10 provides the calling terminal 30 in the first country with an overseas destination notice 30a, prior to setting up a circuit connection. The overseas destination notice 30a includes, for example, the name of the destination country, an approximate rate for the call, and the present local time in the destination country. For this service, the home mobile switch 10 maintains a service subscription database 10b and a call rate database 10c, the details of which are given below.

FIG. 4 shows an example of a record stored in the service subscription database 10b. As mentioned earlier, the overseas destination notification service is available on a subscription basis; i.e., only the users who have registered for the service can receive overseas destination notices 30a from the system. The service subscription database 10b is used to manage the subscription status of each mobile user, and each database entry contains a caller phone number 111 and a subscription flag 112. The caller phone number 111 represents the phone number of a mobile user in the first country, while the subscription flag 112 indicates whether he/she subscribes to the overseas destination notification service. In the example of FIG. 4, the subscription flag 112 is set to "1," meaning that this user is eligible for the service. Non-subscribers, on the other hand, are tagged as "0," for example.

FIG. 5 shows an example of a record stored in the call rate database 10c, which includes the following data fields: country code 121, country name 122, approximate rate 123, and time zone difference 124. The country code field 121 gives a code identifying the destination country, and the country name field 122 shows the name of that country. The approximate rate field 123 gives an approximate phone rate (in units of, for example, dollars per minute) for calls to the destination country. This field 123 may be divided into two or more subfields to list the rates for different time zones. The time zone difference field 124 gives the time difference of the destination country of interest, relative to the time in the calling country (i.e., the first country), in units of hours. The home mobile switch 10 refers to this field 124 to calculate the current time of day in the destination country. The call rate database 10c contains such a record for each different country code.

Figure 6:
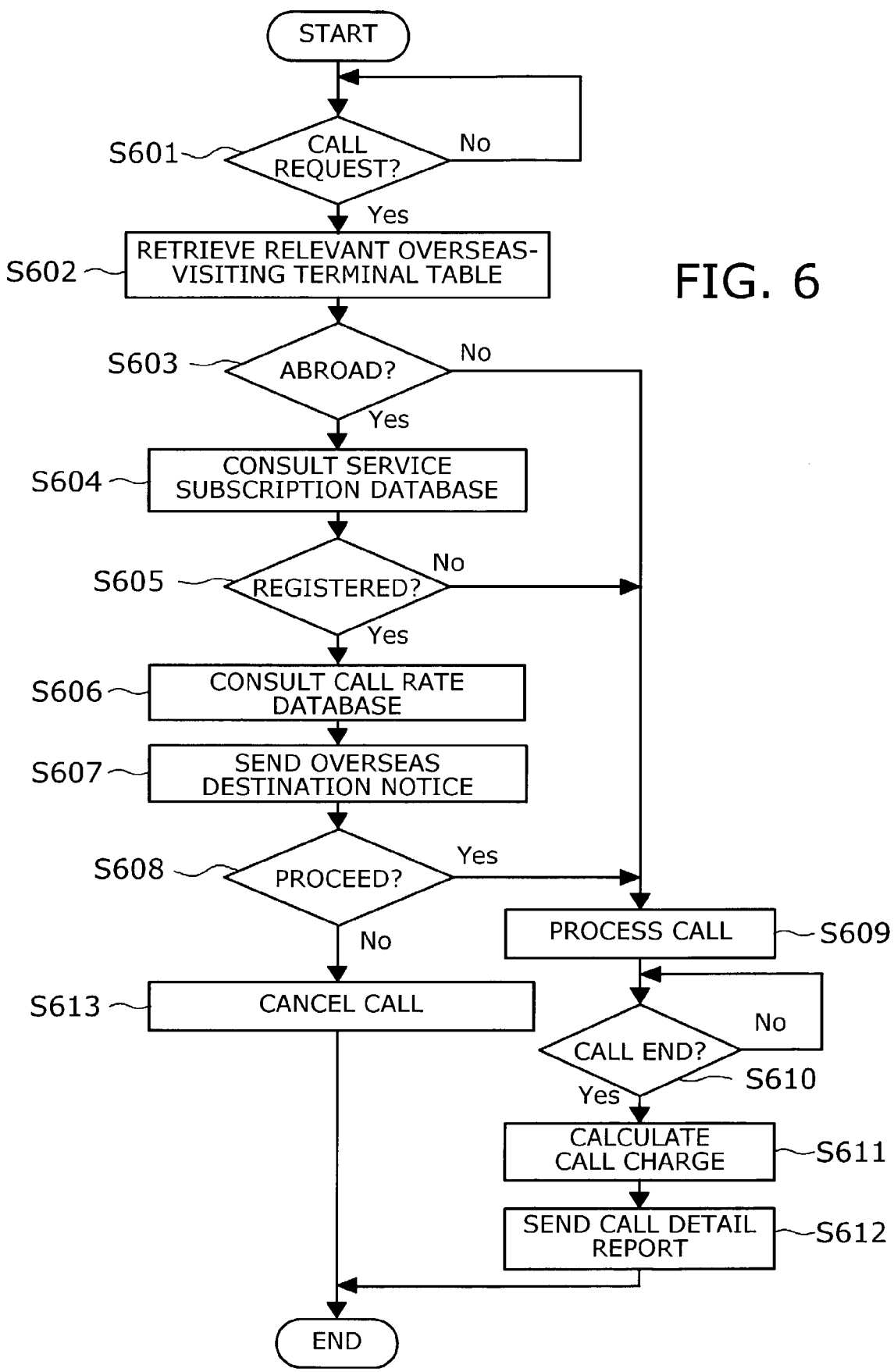
FIG. 6 is a flowchart showing a process that a home mobile switch executes when it receives a call request for a mobile terminal.

Referring to the flowchart of FIG. 6, we will now describe a process that the home mobile switch 10 executes when a call request is received. Consider here that the first mobile terminal 30 in the first country has initiated a call to the second mobile terminal 40. This call request is handled according to the following steps:

(S601) The home mobile switch 10 continues monitoring signals from radio base stations 12a to 12c to determine whether any of them indicates a new call request. Suppose here that there is a call from the first mobile terminal 30 to the second mobile terminal 40. The process then advances to step S602.

(S602) The home mobile switch 10 retrieves a relevant overseas-visiting terminal table from its terminal location database 10a, using the phone number of the called terminal 40 as the search keyword.

(S603) The home mobile switch 10 determines whether the called terminal 40 is located abroad. If so, the process advances to step S604. If no relevant table is found in the terminal location database 10a, the process goes to step S609.

(S604) The home mobile switch 10 then consults the service subscription database 10b to determine whether the calling terminal 30 is registered for the overseas destination notification service.

(S605) If the first mobile terminal 30 is found in the service subscription database 10b, the process advances to step S606. If not, the process branches to step S609.

(S606) The home mobile switch 10 now consults the call rate database 10c to retrieve a record relevant to the country code in the overseas-visiting terminal table that has been found at step S602. It then creates an overseas destination notice 30a from the country name, approximate rate, and time zone difference that are shown in the retrieved record. The current time of day in the destination time zone is calculated with respect to the present local time in the first country. The resulting overseas destination notice 30a thus indicates: in which country the destination mobile terminal 40 currently is, how much will be charged per unit time if the call is connected, and what time it is now in the destination country.

(S607) The home mobile switch 10 transmits the produced overseas destination notice 30a to the first mobile terminal 30.

(S608) The calling terminal 30 responds to the overseas destination notice 30a, telling whether to proceed with the call or cancel it. The home mobile switch 10 examines this response signal and advances to step S609 if the calling user wishes a connection. If the call is canceled by the user, the present process goes to step S613.

(S609) The home mobile switch 10 begins calling the second mobile terminal 40. If the called user answers, the home mobile switch 10 establishes a circuit connection between the two terminals 30 and 40, allowing them to communicate with each other.

In the case this step S609 has been reached from step S603 (i.e., when the called terminal 40 is in the same country), the home mobile switch 10 sets up a domestic connection in the first country at step S609.

Step S609 can also be reached from step S605 or S608. In those cases, the home mobile switch 10 requests the visitor mobile switch 20 to call up the destination mobile terminal 40 because it is known to be in the second country. The visitor mobile switch 20 then consults its own terminal location database 20*b* to identify which of the cells 23*a* to 23*c* is currently accommodating the destination mobile terminal 40. When the cell is identified, the visitor mobile switch 20 sends an incoming call indication to the destination mobile terminal 40 through the relevant radio base station 22*a*, 22*b*, or 22*c*. If the second mobile terminal 40 responds to the indication, the two mobile switches 10 and 20 set up a circuit connection between the two terminals 30 and 40, thus allowing them to communicate with each other.

(S610) The home mobile switch 10 determines whether the call session is finished. If so, the process advances to step S611. If not, it continues to check the status of the session.

(S611) The home mobile switch 10 calculates a call charge from the actual call duration, based on the call rate obtained at step S606.

(S612) The home mobile switch 10 creates a call detail report regarding the just finished call, which includes: call charge calculated at step S611, start and end times (in local time of the first country), and call duration. It transmits this report to the calling terminal 30, thus terminating the present process.

(S613) This step is reached from step S608 when the call is canceled. The home mobile switch 10 terminates the present call procedure, thus disconnecting the signaling channel to the first mobile terminal 30. It also notifies the visitor mobile switch 20, for the record, that the call request to the second mobile terminal 40 has been canceled by the originating mobile terminal 30.

According to the above-described process in the home mobile switch 10, a domestic call request from the first mobile terminal 30 to the second mobile terminal 40 will be executed without interruption. In the case that the destination mobile terminal 40 is in the second country, the home mobile switch 10 handles the call request in two ways, depending on whether the calling user subscribes to the overseas destination notification service. When the calling user is not registered for that service, the call request is executed right away. When the calling user is a registered subscriber, the home mobile switch 10 suspends the call for a while, and instead, sends an overseas destination notice 30*a* back to the calling terminal 30. The pending call request is not executed until an explicit request signal for continuation is received. If a cancel request signal is received in response to the overseas destination notice 30*a*, the home mobile switch 10 terminates the present call procedure, without setting up a connection to the visitor mobile switch 20. No charge will be billed to the user of the first mobile terminal 30 in this case.

Figure 7:
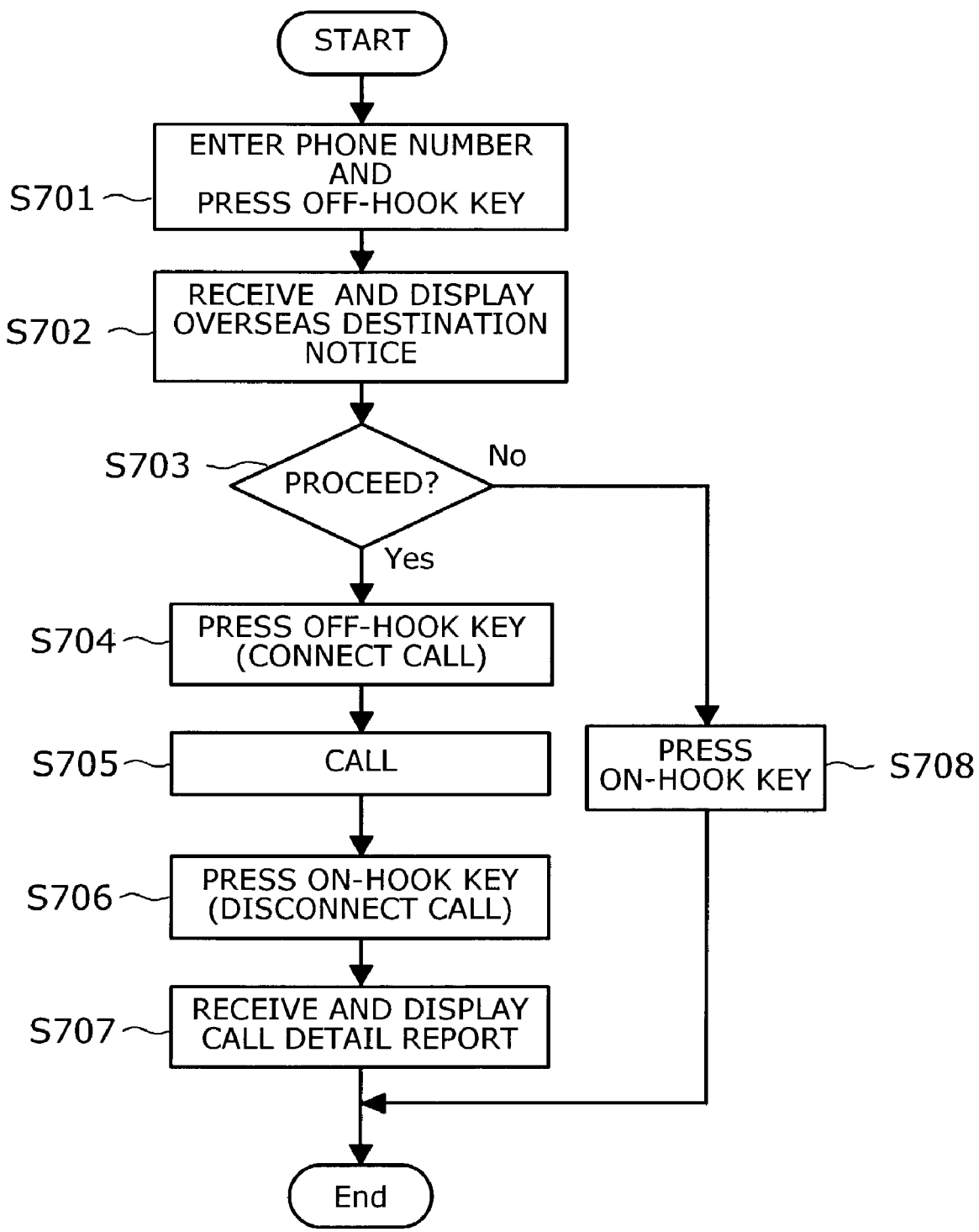
FIG. 7 is a flowchart showing a process that a calling mobile terminal in a first country executes when it initiates a call to another mobile terminal that is roaming abroad.

Referring next to the flowchart of FIG. 7, we will now describe a process that the first mobile terminal 30 executes when it initiates a call to the second mobile terminal 40 that is roaming abroad. Here the first mobile terminal 30 is assumed to have the following data input/output devices, in addition to a loudspeaker and microphone for vocal communication: a liquid crystal display (LCD) for showing the phone number and name of a person to call up, an alphanumeric keypad, an off-hook button for initiating or receiving a call, an on-hook button for clearing a call, and menu selection keys for selecting an item from a given menu. The flowchart of FIG. 7 includes the following steps:

(S701) The calling user operates the alphanumeric keypad and/or menu selection keys to specify a desired destination phone number. He/she then presses the off-hook button to initiate a call, which makes his/her mobile terminal 30 connect itself to the home mobile switch 10 via the nearest radio base station 12*a*, 12*b*, or 12*c*. The specified phone number is transferred as part of the call request signal.

(S702) The calling terminal 30 receives an overseas destination notice 30*a* and shows it on the LCD screen. As have been described in step S606 of FIG. 6, the overseas destination notice 30*a* gives the following information: the name of the country where the destination mobile terminal 40 is currently located, approximate call rate, and current local time in the destination country. We will provide an example screenshot of this overseas destination notice 30*a* in a later section, with reference to FIG. 8.

(S703) The calling user takes a look at the overseas destination notice 30*a* on the LCD screen and determines whether to proceed with the call or cancel it. If he/she wishes to proceed, then the process advances to step S704. If not, the process branches to step S708.

(S704) The user presses the off-hook key again, which invokes a command to the home mobile switch 10 to execute the call request.

(S705) A call session begins when a response is returned from the called terminal 40.

(S706) The calling user presses the on-hook button to close the call session. The second mobile terminal 40 may have already disconnected itself at this moment, because either party can terminate a call.

(S707) The first mobile terminal 30 receives a call detail report from the home mobile switch 10 and shows it on the LCD screen. As have been described in the step S612 of FIG. 6, this report provides the following information: the call charge, start and end times (in local time of the first country), and call duration. We will show an example screenshot of a call detail report in a later section, with reference to FIG. 9.

One method to deliver a call detail report is to use an existing e-mail facility, in which case the user can view it as an e-mail message on the LCD panel by operating menu selection keys and other buttons. Another method is to send text data in some other format. Whatever delivery method is used, an automatic display function may be implemented in mobile terminals to aid the users, so that such a report message will automatically appear on the LCD screen as soon as it is delivered.

FIG. 8 gives an example of the overseas destination notice 30a which appears on the screen of the calling terminal 30. In this example screenshot, the current local time in the originating country is shown in the first line, indicating at what time the user is making a call. The second line gives the name of the person who the calling user is attempting to reach, which is identified by the called phone number shown in the third line. This is only possible when the calling terminal 30 has a memory entry that contains a name in association with that phone number. The fourth and fifth lines show the destination information that has been received from the home mobile switch 10. That is, the fourth line gives the name of the country where the called terminal 40 is currently located, along with approximate charge per unit time that would be billed to the calling user if he/she made a call to that country. Shown in the bottom line is the current local time in the destination country.

The calling user takes a look at such an overseas destination notice 30a on the terminal screen and determines whether to proceed with the call or cancel it. Because the notice 30a on the screen provides the destination country name and expected call charge, the user is now aware that the person whom he/she is calling is visiting a foreign country and the call, if connected, should cost much more than a domestic call. Also, the destination time on the terminal screen allows the calling user to reconsider whether it would be appropriate to make a call now (e.g., being called late in the night is annoying to most people). The overseas destination notice 30a thus permits the calling user to determine whether to execute or cancel the pending overseas call, taking into account its cost, destination time, and importance of the business, before the called person receives a call alert.

FIG. 9 shows an example screenshot of a call detail report which appears on the first mobile terminal 30. The information shown on the fourth to sixth lines has been delivered from the home mobile switch 10. More specifically, the fourth line shows the destination country name and the date in that country, and the fifth line gives the start and end of the call session in local time. The sixth line shows how much the user will be billed for the call he/she made and what duration it was. The calling user can see such details, including cost information, regarding the call that he/she has just finished.

As can be seen from the above explanation, the overseas destination notification service warns mobile users of the international phone rate, thus giving them a chance to consider whether to execute or cancel the pending call before they are actually billed for it. Mobile users can avoid unexpected phone charges even if they have dialed the number of someone without knowing he/she is currently abroad.

According to the present invention, the mobile terminal 40 roaming in a foreign country can receive a notice from the system about a call attempt that was canceled by the calling user when an overseas destination notice 30a appeared on his/her mobile terminal 30. The proposed system implements this function by employing a call log database 20a in the visitor mobile switch 20 to store the information that it has received from the home mobile switch 10 at step 613 of FIG. 6.

FIG. 10 shows an example of a record of the call log database 20a stored in the visitor mobile switch 20. As can be seen, the call log database 20a manages its records for each individual phone number that is currently registered with the global roaming service in the second country. The illustrated record in FIG. 10 represents a specific call log record of the second mobile terminal 40, which contains the following data fields: originating call number 201, call date and time 202, originating country code 203, and time zone difference 204. The originating call number field 201 indicates the phone number of the first mobile terminal 30, which once attempted a call, but aborted it later. The call date and time field 202 shows when that call was attempted. The originating country code field 203 indicates in which country the call request was initiated. In the example of FIG. 10, this field 203 contains a value of "01" for the United States. The time zone difference field 204 shows, in units of hours, how much time difference they have in the originating country shown in the field 203, relative to the local time of the second country.

The visitor mobile switch 20 stores the above log records in its call log database 20a to allow later access by the roaming mobile terminal 40. The mobile terminal 40 may be configured to make this database access automatically at predetermined intervals. The user can see the obtained record on the LCD screen of his/her mobile terminal 40. FIG. 11 gives an example screenshot of a call log record. Shown in the first line is the local time in the second country that indicates when the call was attempted. The second line shows the name of the person who requested the call, followed by his/her phone number in the third line. The caller's name appears on the terminal screen only when the mobile terminal 40 has a memory entry containing that phone number together with its associated name. Shown in the fourth line is the name of the originating country. The timestamp of the call attempt is also given in local time of that country, which the visitor mobile switch 20 has calculated from the time zone difference field 204 of a relevant record in its call log database 20a.

From the above call log record displayed on the screen of the mobile terminal 40, the roaming user learns of a past call attempt by another mobile user. He/she can therefore call back immediately from the second country, or later when he/she comes back to the first country.

To summarize the above explanation, according to one aspect of the present invention, a mobile communications method is provided to process a mobile call request as follows. A home mobile switch 10 in a first country manages a terminal location database 10a that shows in which country each mobile terminal is currently located. When a first mobile terminal 30 has issued a call request to a second mobile terminal 40, and if the terminal location database 10a shows that the called terminal 40 is in the second country, the home mobile switch 10 sends an overseas destination notice 30a to the calling terminal 30 prior to setting up a circuit connection with the visitor mobile switch 20. This notice allows the calling user to determine whether to proceed with the call, thus giving him/her a chance to cancel it when he/she feels reluctant to pay for an expensive international call.

Figure 12:
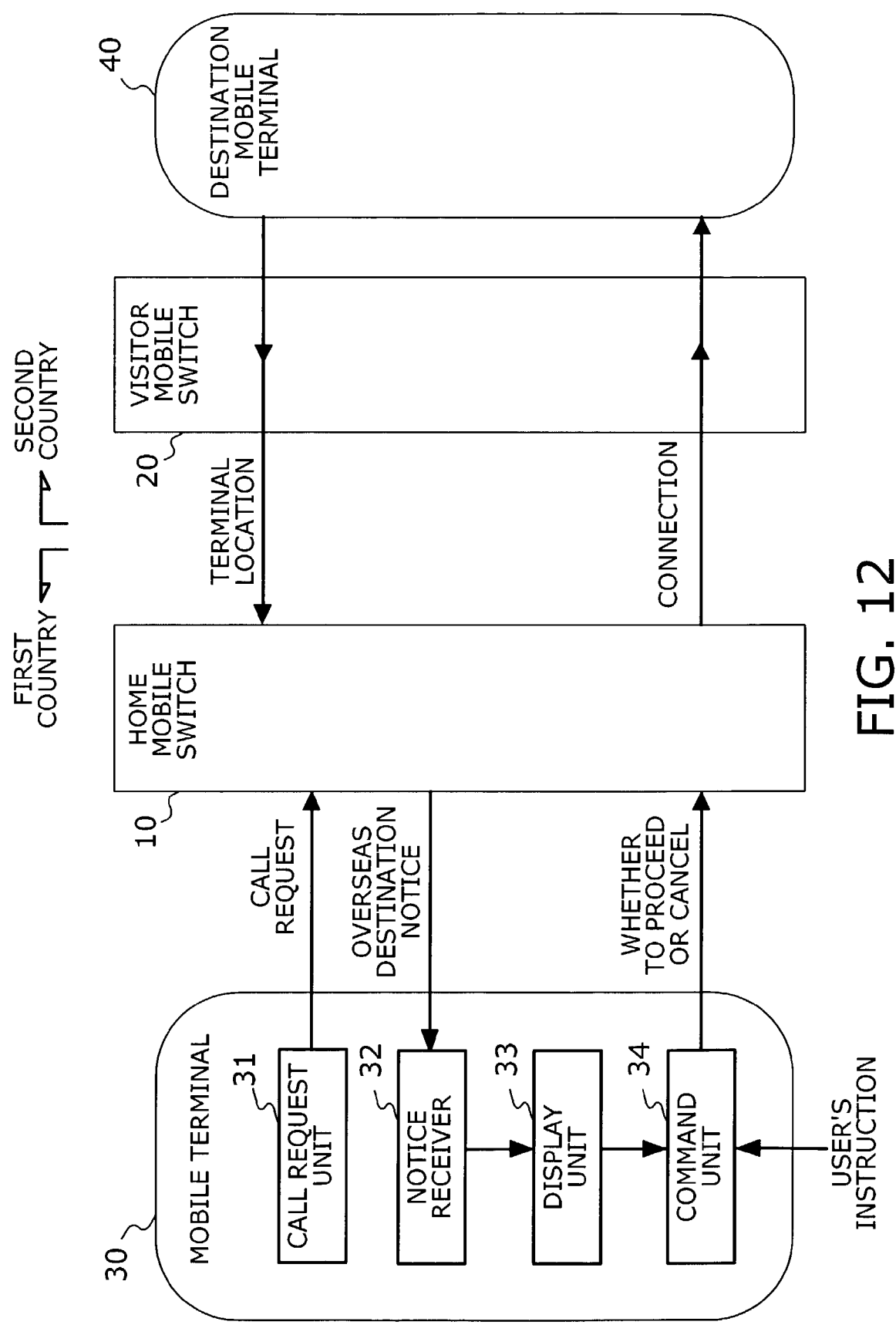
FIG. 12 shows the structure of a mobile terminal according to the present invention.

According to another aspect of the present invention, there is provided a mobile terminal 30 that is designed for use with overseas destination notification services. FIG. 12 shows the structure of this mobile terminal 30. It has a call request unit 31 that initiates a call request addressed to another mobile terminal 40. After the call request is initiated, a notice receiver 32 receives an overseas destination notice from the home mobile switch 10, which indicates that the destination mobile terminal 40 is currently located in a second country. A display unit 33 then shows the received overseas destination notice, which allows the calling user to determine whether to proceed with the call request or cancel it. A command unit 34 then commands the home mobile switch 10 either to proceed with the call request or to cancel the call request, according to the user's instruction. The home mobile switch 10 sets up a connection to the destination mobile terminal 40 only when the calling user wishes it. The proposed mobile terminal 30 thus prevents the user from being billed for an unexpected international call that he/she could have made without knowing the actual location of the called party.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of controlling a mobile communication process in a system where a home mobile switch in a first country and a visitor mobile switch in a second country are interconnected by a telecommunications network to allow a first mobile terminal in the first country to reach a second mobile terminal that is using global roaming service after having moved from the first country to the second country, the method comprising:

sending terminal location information of the second mobile terminal from the visitor mobile switch to the home mobile switch;

consulting the terminal location information in the home mobile switch when a call request addressed to the second mobile terminal is placed by the first mobile terminal;

sending an overseas destination notice from the home mobile switch to the first mobile terminal to indicate that the second mobile terminal is located in the second country;

sending an incoming call indication from the home mobile switch to the second mobile terminal via the visitor mobile switch in response to the first mobile terminal requesting the home mobile switch to proceed with the call request after receiving the overseas destination notice;

terminating call processing for the call request being placed in response to the first mobile terminal requesting the home mobile switch to cancel the call request after receiving the overseas destination notice;

sending a call log record from the home mobile switch to the visitor mobile switch upon receipt of the cancellation of the call request, wherein the call log record indicates that there was a call attempt by the first mobile terminal to the second mobile terminal; and delivering the call log record from the visitor mobile switch to the second mobile terminal in response to a request from the second mobile terminal to the visitor mobile switch;

wherein the overseas destination notice includes information about call charge per unit time which is applicable to calls from the first country to the second country, a local time in the second country that indicates when the call request was placed, or a combination thereof.

2. The method according to claim 1, further comprising providing a call detail report from the home mobile switch to the first mobile terminal after the first and second mobile terminals have finished a call session, the call detail report containing information about the duration of and charge for the call session.

3. The method according to claim 1, wherein the terminal location information of the second mobile terminal has been registered with the visitor mobile switch by the second mobile terminal in the second country.

4. The method according to claim 3, wherein said registration of the terminal location information of the second mobile terminal is invoked by a manual operation by a user of the second mobile terminal.

5. The method according to claim 3, wherein said registration of the terminal location information of the second mobile terminal is invoked automatically after the second mobile terminal has entered a service area of the visitor mobile switch.

6. The method according to claim 1, further comprising:

providing a service subscription database in the home mobile switch to manage which mobile terminal is registered with overseas destination notification services; and consulting the service subscription database in response to receiving the call request, in order to determine whether the first mobile terminal is eligible for receiving the overseas destination notice.

7. The method according to claim 6, further comprising sending an incoming call indication from the home mobile switch to the second mobile terminal via the visitor mobile switch in response to the service subscription database indicating that the first mobile terminal is not eligible.

8. The method according to claim 1, wherein the overseas destination notice includes a name of the second country.

9. A method of controlling a mobile communication, the method comprising:

sending a notification to a mobile terminal in a first country that a receiver of a requested call is using a global roaming service in a second country;

completing the requested call in response to the mobile terminal choosing to proceed after receiving the notification;

terminating call processing for the requested call being placed in response to the mobile terminal requesting to cancel the requested call after receiving the notification;

sending a call log record from a home mobile switch in the first country to a visitor mobile switch in the second country upon receipt of the cancellation of the requested call, wherein the call log record indicates that there was a call attempt by the mobile terminal to the receiver; and delivering the call log record from the visitor mobile switch to the receiver in response to a request from the receiver to the visitor mobile switch;

wherein the notification includes information about call charge per unit time which is applicable to calls from the first country to the second country, a local time in the second country that indicates when the requested call was placed, or a combination thereof.

* * * * *